Patented June 24, 1930

1,766,763

UNITED STATES PATENT OFFICE

MATHIAS PIER, OF HEIDELBERG, AND MARTIN MÜLLER-CUNRADI, GUSTAV WIETZEL, AND KARL WINKLER, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PROCESS OF PRODUCING GASES FOR THE MANUFACTURE OF OXYGENATED ORGANIC COMPOUNDS

No Drawing.  Application filed September 15, 1923. Serial No. 662,961.

It has been found that by the action of suitable catalysts on mixtures of oxids of carbon and hydrogen, or hydrocarbons rich in hydrogen, at an elevated pressure and temperature, methanol or other oxygenated organic compounds are produced with good yields. However, on carrying out the process on an industrial scale, certain difficulties are experienced, the catalysts soon losing efficiency, or giving rise to undesirable secondary reactions, resulting in the formation of hydrocarbons and the like. A thorough investigation has shown that such irregularities are caused by the circumstance that the gases subjected to the catalytic action, even if carefully purified in the usual way, are not pure enough for the purpose in question and that it is indispensable to remove even traces of volatile compounds of iron, especially iron carbonyl compounds. Provided the gases are purified to such a degree that neither sulfur, nor iron, compounds can be found in the gases, the contact masses will work reliably and continuously, producing methanol and similar compounds.

By the present invention it is rendered possible to employ most various industrial gases. These should be suitably composed so as to contain hydrogen in an amount surpassing that of carbon oxids. For example, blue gas composed of, by volume, 40 per cent of carbon monoxid, 55 per cent of hydrogen, 4 per cent of nitrogen and 1 per cent of hydrocarbons, may be employed, or coal gas, coke oven gas, low temperature carbonization gas or mixtures, and if so required, insufficient percentage of carbon monoxid, or hydrogen may be completed by adding proper gases, or removing an excess present until the proportion desired is attained, for instance 3 or 4 volumes of hydrogen to each one volume of carbon monoxid. Such corrections may be made either before, or after purification of the industrial gases.

In order to effect the purification desired the bulk of the impurities is first removed in the usual way and unsaturated or aromatic hydrocarbons may also be removed and subsequently a purifying treatment, as efficient as possible, should be applied. Carbon oxy-sulfid and other organic sulfur compounds may be absorbed by active carbon or decomposed with soda lime or potash lime, or absorbed as well as decomposed, either successively or simultaneously. Or, the gas may be passed over a hot mass containing caustic alkali. A very efficient method of purification consists in mixing the gas with steam, conveying the mixture over a contact mass, suitable to convert part of the carbon monoxid into carbon dioxid, while liberating hydrogen, for example iron oxid, the organic sulfur compounds being thereby decomposed and sulfuretted hydrogen formed which can be removed without difficulty.

In order to completely remove iron carbonyl compounds from the gas which will not be retained by the ordinary means of removing contact poisons, special methods must be resorted to. To the said end, the gas may be led through a layer of active carbon, particularly selected for the retention of iron compounds or it may be conducted over a hot copper-containing mass, or a mass substantially similar to the methanol forming catalyst and the mist of iron particles, if any, produced retained by a filter.

All or part of these operations may be effected at increased pressure.

At the same time it is advisable to keep also the contact mass free from sulfur and other obnoxious admixtures, though small amounts of sulfur, chlorin, phosphorus, arsenic or the like are in most cases but little injurious especially if the contact mass contains a strong base.

We do not claim in this application to have invented the complete exclusion of iron and nickel from the reaction, such invention being described and claimed in United States Patents 1,569,775 and 1,558,559, and the invention covered by said patents was made before the invention of the present application, which covers the step of purifying the gases from volatile iron compounds. Mathias Pier, one of the applicants herein, is the same Mathias Pier named as patentee in the above mentioned United States Patents 1,569,775 and 1,558,559.

We claim:

1. In a process of manufacturing methanol or other oxygenated organic compounds by catalytically reducing, under pressure, carbon oxids with hydrogen, the step comprising freeing the gases from volatile compounds of iron prior to their coming into contact with the catalyst.

2. In a process of manufacturing methanol or other oxygenated organic compounds by catalytically reducing, under pressure, carbon oxids with hydrogen, the step comprising freeing the gases from volatile carbonyl compounds of iron prior to their coming into contact with the catalyst.

3. A process of manufacturing methanol or other oxygenated organic compounds by catalytically reducing, under pressure, carbon oxids with hydrogen, which is characterized by passing the gas mixture containing a carbon oxid and hydrogen prior to the catalytic reaction through a layer of active carbon sufficient to retain the volatile iron compounds.

4. A process of manufacturing methanol or other oxygenated organic compounds by catalytically reducing, under pressure, carbon oxids with hydrogen, which is characterized by passing the gas mixture containing a carbon oxid and hydrogen prior to the catalytic reaction into contact with active carbon.

In testimony whereof we have hereunto set our hands.

MATHIAS PIER.
MARTIN MÜLLER-CUNRADI.
GUSTAV WIETZEL.
KARL WINKLER.